US010319260B2

(12) United States Patent
Jiang

(10) Patent No.: US 10,319,260 B2
(45) Date of Patent: Jun. 11, 2019

(54) METHODS, APPARATUS AND COMPUTER PROGRAM FOR AUTOMATICALLY DERIVING SMALL-SCALE MAPS

(71) Applicant: Bin Jiang, Gävle (SE)

(72) Inventor: Bin Jiang, Gävle (SE)

(*) Notice: Subject to any disclaimer, the term of this patent is extended or adjusted under 35 U.S.C. 154(b) by 180 days.

(21) Appl. No.: 15/387,803

(22) Filed: Dec. 22, 2016

(65) Prior Publication Data

US 2018/0182264 A1    Jun. 28, 2018

(51) Int. Cl.
*G09B 29/10* (2006.01)
*G09B 29/00* (2006.01)
*G01C 21/36* (2006.01)

(52) U.S. Cl.
CPC ......... *G09B 29/106* (2013.01); *G01C 21/367* (2013.01); *G09B 29/003* (2013.01)

(58) Field of Classification Search
None
See application file for complete search history.

(56) References Cited

FOREIGN PATENT DOCUMENTS

WO     WO-2006033553 A1 *  3/2006  ............ G09B 29/00

OTHER PUBLICATIONS

Jiang, Bin (2014): Head/Tail breaks for visualization of city structure and dynamics, Cities,www.elsevier.com/locate/cities. (Year: 2014).*

B. Jiang, "Head/tail Breaks: A New Classification Scheme for Data with a Heavy-tailed Distribution", The Professional Geographer, 2013, 65 (3), pp. 482-494.
B. Jiang, "Head/tail Breaks for Visualization of City Structure and Dynamics", Cities, 2015a, 43, pp. 69-77.
B. Jiang, "Geospatial Analysis Requires a Different Way of Thinking: The Problem of Spatial Heterogeneity", 2015b, GeoJournal, 80(1), pp. 1-13.
B. Jiang, "A Topological Representation for Taking Cities as a Coherent Whole", 2016b, (https://arXiv:1607.07169) [nlin.AO].
B. Jiang, "Ht-Index for Quantifying the Fractual or Scaling Structure of Geographic Features", Annals of the Association of American Geographers, 2014, 104(3), pp. 530-541.
B. Jiang, "Scaling as a Design Principle for Cartography", Annals of GIS, 2016 (http://dx.doi.org/10.1080/10475683.2016.1251491).
B. Jiang et al., "Scaling of Geographic Space as a Universal Rule for Map Generalization", Annals of the Association of American Geographers, 2013, 103(4), pp. 844-855.
B. Jiang et al., "Self-Organized Natural Roads for Predicting Traffic Flow: A Sensitivity Study", Department of Land Surveying and Geo-informatics, The Hong Kong Polytechnic University, 2008, pp. 1-23.

* cited by examiner

*Primary Examiner* — Mussa A Shaawat
*Assistant Examiner* — Abdhesh K Jha
(74) *Attorney, Agent, or Firm* — Patent Portfolio Builders PLLC

(57) ABSTRACT

One or more small-scale maps are generated automatically and directly from a single large-scale map or database. A subset of geographic features to be represented in the small-scale map is selected based on the scaling law. The geographic features in the subset are determined based on topological connectivity, size, bend size or point density characterizing the geographic features, so the subset includes the larger or more connected or with higher density among the geographic features.

18 Claims, 7 Drawing Sheets

METHODS, APPARATUS AND COMPUTER PROGRAM FOR AUTOMATICALLY DERIVING SMALL-SCALE MAPS

BACKGROUND

Technical Field

Embodiments of the subject matter disclosed herein generally relate to deriving small-scale maps from a large-scale map or database.

Discussion of the Background

Nowadays, people seldom use printed maps, preferring instead to use various computer displays. Computers have had significant positive impacts on enhancing the quality and quantity of information represented in maps. However, these improvements also pose a challenge because it becomes difficult to meaningfully and clearly visualize all the information.

Any map is characterized by a map scale 1:M, which is a ratio between a unit on the map versus a real life-size M. For example, a 1:10,000 scale means that 1 cm on the map corresponds to 10,000 cm=100 m in real life. In a map, there is a minimum size, below which geographic features cannot be clearly recognized. This is called minimum map unit. All geographic features represented in a map should be greater than the minimum map unit. Items represented on the maps—streets, lakes and rivers, buildings, etc.—are known as geographic features.

Theoretically, all the geographic features (which may be stored in a database) may be represented on a large and detailed enough map (called a "large-scale map" in this document) characterized by an original scale $1:M_o$. However, in practice, people frequently need maps with small scales (i.e., less detailed) than the original scale. Simplistically, one may think that a small-scale map (characterized by a smaller scale than the original scale) is merely a proportionally smaller version of the large-scale map. However, such a proportional approach sabotages the ability to distinguish the geographic features, rendering the proportional small-scale map useless; see FIG. 8 for an illustration.

Conventionally, operator intervention has been employed to derive small-scale maps of a few limited scales rather than all scales, yet even when assisted by software tools, it is a subjective and time-consuming approach. Research has been carried out to derive a few limited scales of maps that involve often some geographic features rather than all geographic features. Overall, there is no automatic solution to map generation of small scales, so in practice multiple scales of maps and databases are maintained. Thus it creates enormous difficulties to maintain and update these maps and databases.

Another drawback in the conventional approach to generating maps with scales smaller than an original scale is that it is done step by step, with each map being obtained from its closest larger scale map. This step-by-step approach can propagate errors from one map to the next.

Therefore, it is desirable to develop automated methods that avoid maintaining and updating multiple scales of maps or databases, and avoid the drawbacks of the conventional approach.

BRIEF SUMMARY

In various embodiments, small-scale maps with scales in a scale series are automatically derived from a single large-scale map or database in a manner based on the scaling law of the existence of far more small things than large ones, and a holistic view of all geographic features. Wherever possible, topological measures are given a higher priority than geometric measures for selecting geographic features to be represented in small-scale maps. Unlike conventional maps, which are generalized from their closet large-scale maps in a step-by-step fashion, each of the small-scale maps is generated directly from the single large-scale map. This direct approach helps avoid error propagation. Quality of small-scale maps is determined by the scaling law or all geographic features themselves rather than subjectively determined by human cartographers.

According to an embodiment, there is a method for generating one or more small-scale maps from a single large-scale map or database. The method includes selecting a subset of geographic features to be represented in the small-scale map. The number of geographic features and what geographic features are in the subset is automatically determined based on the scaling law, and constrained by a minimum map unit. The geographic features in the subset are determined based on topological connectivity or, size or bend size or density characterizing them so the subset includes the more connected or larger or higher density geographic features. The method further includes generating the small-scale map using the subset of selected geographic features while maintaining topological relationships present in the single large-scale map or database among the selected geographic features.

According to another embodiment, there is a map-generating apparatus configured to automatically generate one or more small-scale maps from a single large-scale map or database. The apparatus has an interface configured to enable receiving input triggering one or more small-scale maps to be generated and to output one or more small-scale maps, and a data processing unit. The data processing unit is connected to the interface and configured to perform for each of the one or more small-scale maps and for each type of geographic features: (1) selecting a subset of geographic features to be represented in the small-scale map, and (2) generating the small-scale map using the subset of selected geographic features while maintaining topological relationships present in the single large-scale map or database among the selected geographic features. The number of geographic features and what geographic features are in the subset are determined based on the scaling law, and the geographic features in the subset are determined based on topological connectivity or size or bend size or point density characterizing the geographic features, so the subset includes the larger or more connected or with higher density among the geographic features.

According to yet another embodiment, there is a non-transitory computer-readable recording medium storing executable codes which, when executed by a processor having access to a large-scale map or database, generates one or more small-scale maps by performing for each one the following steps: (1) selecting a subset of geographic features to be represented in the small-scale map, and (2) generating the small-scale map using the subset of selected geographic features while maintaining topological relationships present in the single large-scale map or database among the selected geographic features. The number of geographic features and what the geographic features are in the subset are determined based on the scaling law and constrained by a minimum map unit, and the geographic features in the subset are determined based on topological connectivity or size or bend size or point density characterizing the geographic features, so the subset includes the larger or more connected or with higher density among the geographic features.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
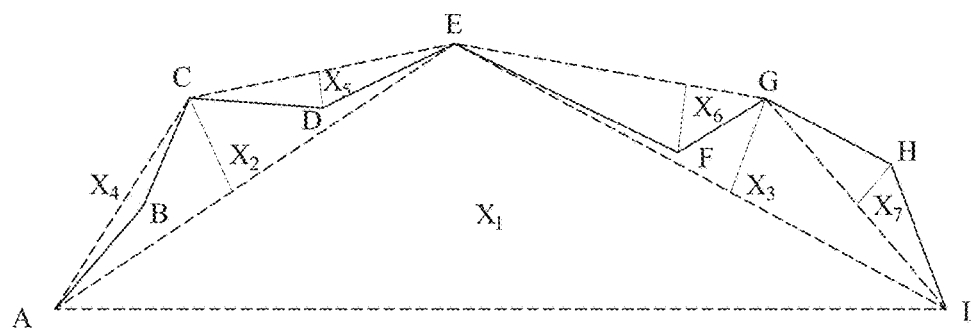
FIG. 1 illustrates a cartographic curve with plural recursively defined bends.

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The embodiments described in this section automatically generate (i.e., derive) small-scale maps directly from a single large-scale map or database. The small-scale maps are characterized by derived scales $1:M_d$ that are smaller than the original scale (i.e., $M_d$ is larger than $M_o$). The small-scale maps represent only a subset of the geographic features in the large-scale map or database. The geographic features in the subset are selected using the scaling law as explained below.

A series of scales, including scales for which $M_d/M_o$ are successive powers of 2, are defined as primary scales. For example, if the original scale is 1:1,000 (this original scale value is merely illustrative and not intended to be limiting), then primary scales are 1:2,000, 1:4,000, 1:8,000, 1:16,000, 1:32,000, 1:64,000, 1:128,000, 1:256,000, 1:512,000, 1:1,024,000, 1:2,048,000, 1:4,096,000, 1:8,192,000, 1:32,768,000.

In this context, the minimum scale $1:M_m$ is the smallest scale in the series of scales. For a city, the minimum scale is 1:1,024,000 corresponding to a $2^{10}$ ratio $M_m/M_o$. For a country, the minimum scale is 1:4,096,000 corresponding to a $2^{12}$ ratio $M_m/M_o$. For the entire world, the minimum scale is 1:32,768,000 corresponding to a $2^{15}$ ratio $M_m/M_o$. Note that here, city is not arbitrarily defined based on tradition or administrative rules, but it is rather a natural city. A natural city is naturally derived city boundary based on massive geographic information, e.g., all street nodes or junctions of an entire country. All these nodes firstly constitute a triangulated irregular network (TIN). All the edges of the TIN demonstrate a heavy tailed distribution. Using head/tail breaks, we partition all the TIN edges into two parts: those below the average length called the tail, and those above the average called the head. All the edges in the tail constitute natural cities.

As previously mentioned, the term "geographic features" refers to meaningful geographic objects or spatially coherent entities such as streets, buildings and cities. The term does not refer to geometric objects such as pixels, points, lines and polygons that may be used to represent the geographic features on maps. The term "streets" refers to entire natural streets rather than street segments between two intersections. Here, natural streets are made of segments joined based on good continuity rule (e.g., from each segment, a next segment is the one with smallest deflection angle, all segments being eventually merged to create natural streets).

Scaling law refers to the fact that in a geographic space there are far less significant or relevant geographic features than significant or relevant ones. The manner of assessing significance or relevance depends on the type of geographical feature. For example, if the significance or relevance assessment is based on connectivity (as suitable for streets), there are far more less-connected geographic features than well-connected geographic features. In another example, if the significance or relevance assessment is based on size (e.g., height, surface or volume for buildings), there are far more small geographic features than large geographic features on the Earth's surface (and therefore, far more small symbols than large ones in any map). Semantically, the scaling law states that there are far more meaningless things than meaningful ones.

Under the scaling law, the Gaussian view, which assumes that geographic features are more or less similar (and therefore have similar attribute values), is replaced by a Paretian way of thinking that geographic features' attribute values have underlying skewed distributions such as power laws, Pareto and lognormal distributions. Such a distribution may be better characterized by head/tail breaks in order to derive the underlying scaling hierarchy of numerous smallest, a very few largest, and some in between the smallest and the largest. The head/tail breaks works as follows. Given an attribute (number of connections, height, surface, volume, etc.) of geographic features whose distribution is right skewed, a mean value of the attribute values is calculated first. The geographic features are then split in two groups: a first group ("the head") includes the geographic features having large (above the mean) attribute values, and a second group ("the tail") includes the geographic features having small (below the mean) attribute values. The geographic features in the first group are a minority (e.g., less than 40%), while the geographic features in the second group are a majority.

The same head/tail breaks process is then performed for the geographic features in the first group (the head). Progressively and iteratively, the geographic features are analyzed in the same manner until the attribute values of the geographic objects in the head group no longer meet the condition of far more small things than large ones.

For example, streets are characterized by their respective number of connections with other streets. Based on a rank-size plot for the numbers of connections (which is right skewed, as far more streets are less-connected than well-connected), the streets can be split (according to head/tail breaks under the scaling law) into streets (T1) having fewer than average number of connections, and streets (H1) having more than average number of connections. The streets in T1 have lowest level (i.e., level 1), and are the first group of streets to be discarded (no longer represented) in a small-scale map.

If H1 still has a skewed rank-size plot of the numbers of connections, the streets in H1 are then split into H2 and T2. The streets in T2 have next-to-lowest level (i.e., level 2), and are the second group of streets to no longer be represented in a small-scale map. If H2 still has a skewed rank-size plot of the number of connections, the streets in H2 are split into H3 and T3, etc.

This way, both the number of levels and the interval of values for each level are naturally and automatically derived. The number of levels, or equivalently the ht-index, indicates hierarchical levels of the geographic features based on their attribute values.

Bends in a cartographic curve may be analyzed in a similar manner. A bend is a basic unit of a curve or part of a polygon representing a linear geographic feature such as a highway or a lake. The small bends in such a curve are far more numerous than the large ones. For example, the cartographic curve illustrated in FIG. 1 has seven bends $x_1$-$x_7$. Since bends $x_1$, $x_2$, $x_3$ are far larger than small bends $x_4$, $x_5$, $x_6$, $x_7$, the former are in the head group and the latter in the tail group (level 1). Focusing now on the bends in the head group, bend $x_1$ is far larger than bends $x_2$, $x_3$. Therefore, bend $x_1$ is in a second head group, while bends $x_2$ and $x_3$ are in a second tail group (level 2). Since the second head group has only one member (i.e., $x_1$, which has level 3) the head/tail breaks process cannot continue. Since the head/tail breaks worked twice for the bends of the cartographic curve in FIG. 1, the cartographic curve has an ht-index h(x)=3, and $x_1$-$x_7$ levels are 3, 2, 2, 1, 1, 1, and 1 respectively.

To summarize, head/tail breaks is used for determining levels of geographic features of the same type (characterized by values of a same attribute) and an ht-index of the geographic features whose attribute values form heavy-tailed (i.e., right-skewed) distributions. The geographic features are divided into a very few geographic features characterized by large attribute values (corresponding, e.g., to large or well-connected streets) in a head group, and numerous geographic features characterized by small attribute values in the tail group. Recursively, the focus shifts to the geographic features in the head group, which are again divided if their attribute values form a heavy-tailed distribution, until the distribution of the head geographic features no longer has a heavy tailed distribution.

Figure 2:
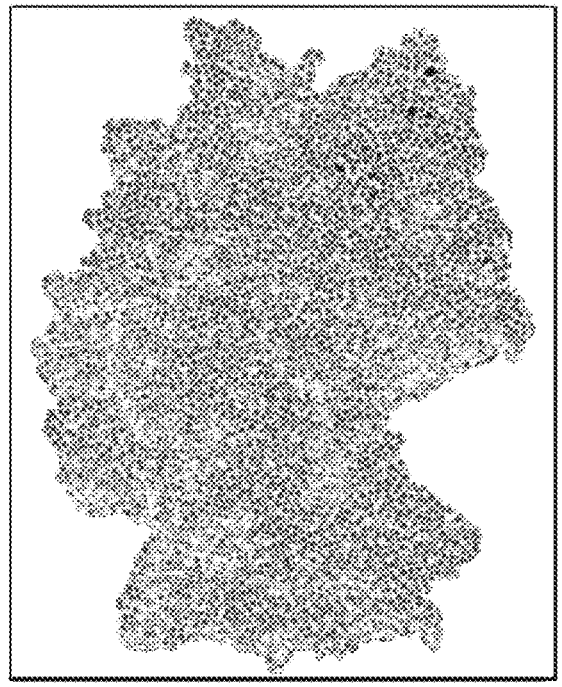
FIG. 2 is a map including 50,000 naturally defined cities.
Figure 3:
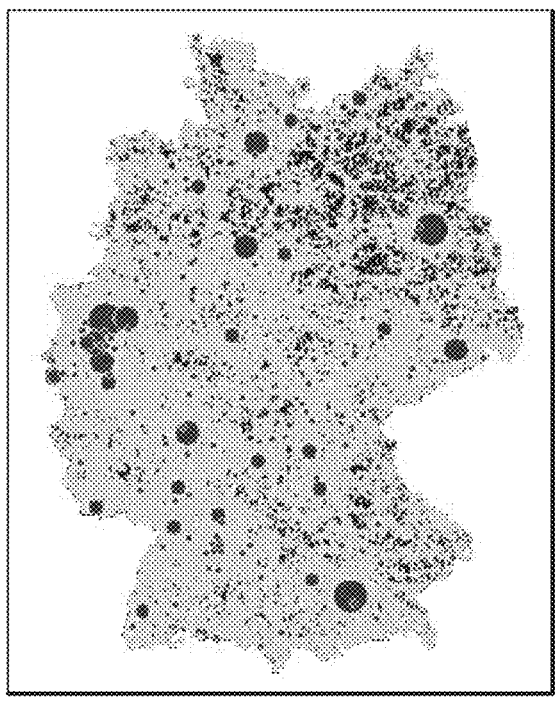
FIG. 3 is the map in FIG. 2 in which lower-level cities or small cities so to speak have been removed, yet this derived map is self-similar to the map in FIG. 2.

FIGS. 2 and 3 illustrate the visualization impact of removing less significant (lower levels) geographic features. FIG. 2 is a Germany map with 50,000 cities. Analysis of the distribution of these cities' points of interest splits them in seven levels (i.e., ht-index is 7). FIG. 3 shows only the cities that have the higher four levels (i.e., not in the tails of the initial distribution and two subsequent distributions). FIG. 3, where the less significant (lower levels) cities have been removed, exhibits a pattern corresponding to the underlying cities pattern or structure in FIG. 2, but also enables the viewer to distinguish its scaling pattern of far more small cities than large ones.

In this document, the term "topology" refers to topological relationships between geographic features, so its meaning is different fundamentally from the same notion used in geographic information systems (GIS). In the GIS literature, topology refers to the relationship between geometric elements such as pixels, points, lines, and polygons. Here, topology used in this document enables visualization of the underlying scaling of far more less-connected things than well-connected ones, or far more small things than large ones in general.

Figure 4:
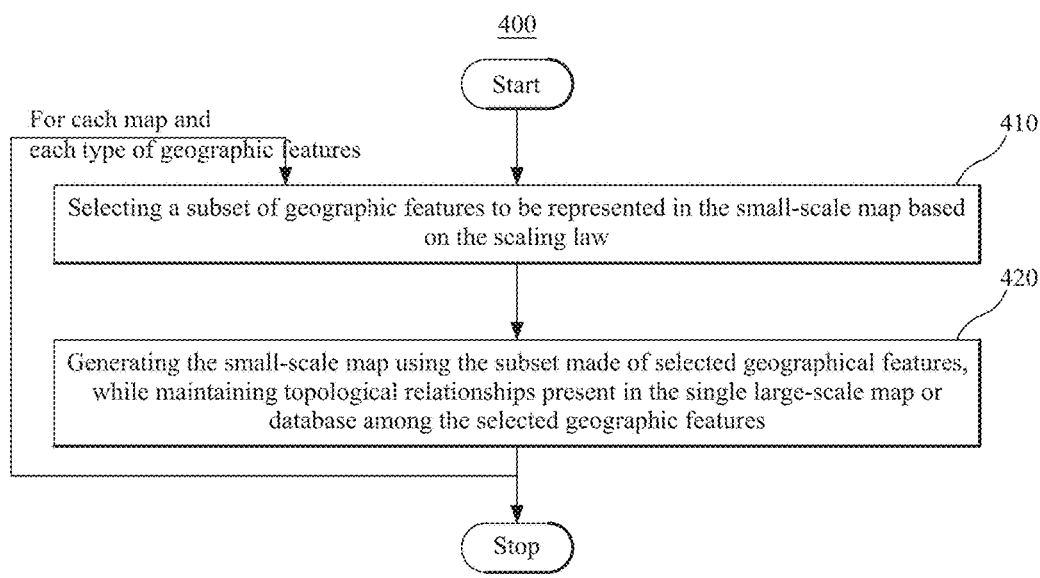
FIG. 4 is a flowchart of a method according to an embodiment.

FIG. 4 is a flow diagram of a method 400 for automatically (without operator intervention) generating one or more small-scale maps directly from a single large-scale map or database. Automatic generation of small-scale maps is based on a holistic view of the geographic space involving all the geographic features therein. The maps may represent an entire country, if not an entire continent or the entire world. Alternatively or additionally, the mapping target may be a city. The city is not arbitrarily defined (e.g., by government), but naturally derived from the country as whole. Natural cities are thus sub-wholes of the country. The larger the area covered by the large-scale map or database (e.g., the country) the more striking the scaling law applies.

The method may generate any small-scale map characterized by a scale smaller than the original scale. The scale may have a value in a series of scale values as the previously-described primary scales. Two or more small-scale maps may be derived simultaneously. All the small-scale maps are derived directly from the large-scale map or database. Steps 410 and 420 described below are performed automatically for each small-scale map that method 400 generates.

At 410, geographic features to be represented in the small-scale map are selected according to the scaling law. The selected geographic features are a subset of the geographic features in the large-scale map or database. Geographic features of each geographical feature type (i.e., characterized by a different attribute) are treated separately.

If the geographic features are associated with a degree of connectivity, then connectivity rather than their size is used to select the geographic features to be represented in the small-scale map. Which levels (i.e., groups of the connected geographic features ranging from the least connected at level 1 to the most connected at a level equal to the ht-index) to be represented on maps of different scales is determined holistically based on the ht-index obtained as previously described. Formally, the level of geographic features above which to be represented in a map of scale 1:$M_d$ is calculated as follows:

$$T = \frac{\log_2\left(\frac{M_d}{M_0}\right)}{\log_2\left(\frac{M_m}{M_0}\right)} \times h(c) \quad (1)$$

where h(c) is the ht-index of a degree of connectivity of all connected geographic features of a certain type. Equation (1) can be modified slightly by changing h(c) to h(x) for example to be applied to the geographical features characterized by other attributes (such as size, bend size and point density) as long as the attribute values yield a heavy tailed distribution; see the below formulas (2) and (3).

The reduction in the number of geographic features in a small-scale map using the above-described technique is smaller in the conventional approach (an empirical Töpfer's law derived from map sheets rather than a whole like a country). For example, from level to level, the scaling-law-based approach yields a reduction to 40% in the number of geographic features, while the conventional approach yields a reduction to about 70%.

Method 400 further includes, at 420, generating the small-scale map using the subset of geographic features while maintaining the topological relationships present in the single large-scale map or database among the selected geographic features. In case the topological relationships changed in the small-scale map, operations such as displacement and merging must apply in order to maintain these initial topological relationships. For example, the two parallel streets in the large-scale map are separated from each other, in the small-scale map may be merged. In another example, one street and one lake are disjoint in the large-scale map, in the small-scale map seem to overlap. In this case, the lake is displaced in order to avoid it overlapping the street.

In some embodiments, linear geographic features characterized by geographic details associated with different levels are simplified. For example, the cartographic curve in FIG. 1 has an ht-index=3. The geometric details represented in a small-scale map having the scale $1:M_d$ are selected to be associated with a level larger than $$G = \frac{\log_2\left(\frac{M_d}{M_0}\right)}{\log_2\left(\frac{M_m}{M_0}\right)} \times h(x). \qquad (2)$$

where $h(x)$ is the ht-index of all bends of a cartographic curve or polygon.

Figure 5:
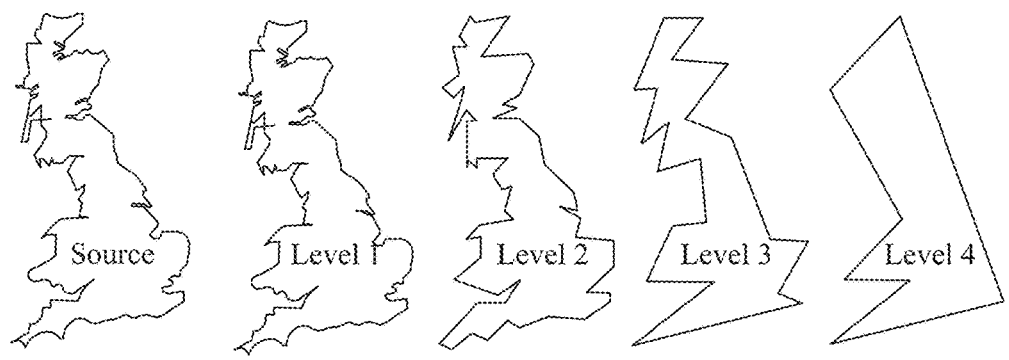
FIG. 5 is a sequence of Britain coastlines illustrating line simplification based on bend size.

A polygon is considered to consist of two cartographic curves resulting from partitioning the polygon along its longest axial direction. For example, if $M_d/M_o=2^5$ and $M_m/M_o=2^{10}$, then G=1.5 for the cartographic curve in FIG. 1. Therefore, in the small-scale map of scale $1:M_d$ only bends $x_1, x_2, x_3$ are represented. If the small-scale map is characterized by the minimum scale $M_d=M_m$, geometric detail G=h(x) (=3 for the cartographic curve in FIG. 1), which means that only highest level details are illustrated (e.g., only bend $x_1$ together with the two ending points is represented for the cartographic curve in FIG. 1). Conversely, in the map having the original scale $M_d=M_o$, G=0, which indicates that all the details starting at the lowest level are illustrated, thus, no simplification at all. For all other scales between the roughest and the most detailed, geometric detail G is between 0 and h(x), i.e., 0<G<h(x). FIG. 5 illustrates the effect of gradual removal of small bends (level by level) for the Britain coastline.

The same holistic approach is applied when the geographic features are point-like features (e.g., points of interest such as bus stops, locations of churches and schools) with different densities. In order to select which of the point-like geographic features are to be represented in a small-scale map, a triangulated irregular network (TIN) is created considering all the point-like features in the large-scale map or database. The reciprocal of the TIN edges follow a heavy tailed distribution, indicating that there are far more low-density points than high-density points. Every point-like geographic feature is then associated with a hierarchical level, and the level of points to be represented in a small-scale map having the scale $1:M_d$ is $$P = \frac{\log_2\left(\frac{M_d}{M_0}\right)}{\log_2\left(\frac{M_m}{M_0}\right)} \times h(\rho). \qquad (3)$$

where $h(\rho)$ is the ht-index of all densities of individual points as a whole.

Figure 6:
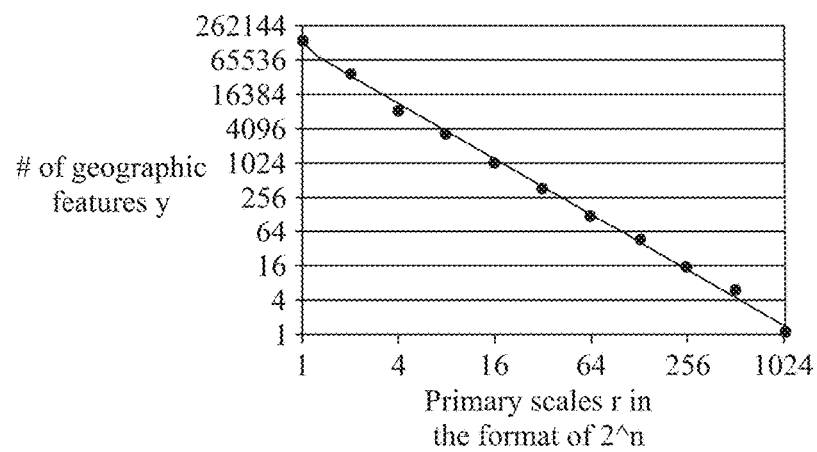
FIG. 6 is a graph of number of buildings versus map scale in a log-log plot.

Formulas (1)-(3) are simpler to evaluate when the ratio of the scale denominators is powers of 2, but they may in principle be applied for any scale. The number of geographic features of a certain type for small-scale maps whose scale is not in a power of 2 ratio with the original scale may be evaluated in the following manner. The number of geographic features of a certain type is evaluated for every of the primary scales. Then, using this number, a power law $y=Nr^{-c}$ is established, where y is the number of geographic features of a certain type in a small-scale map (known for every of the primary scales), N is a constant, r is the primary scale as a variable and c is called power law exponent. Establishing the power law basically means calculating th constant N, and exponent c. The relationship is then used to calculate the number of geographic features of the certain type in a map of any scale. For example, FIG. 6 is a graph of the number of buildings versus scale in a log-log plot for a power law $y=129,241\ r^{-1.65}$. This power law can determine the number of buildings with any map scale in the range. Once the number is established, the subset of buildings is selected from the largest to smaller ones up to the determined number.

An advantage of the above-described technique for generating one or more small-scale maps is that, unlike the conventional approach, each of the maps is derived directly from the single large-scale map or database. This direct derivation avoids the problem of error propagation.

Figure 7:
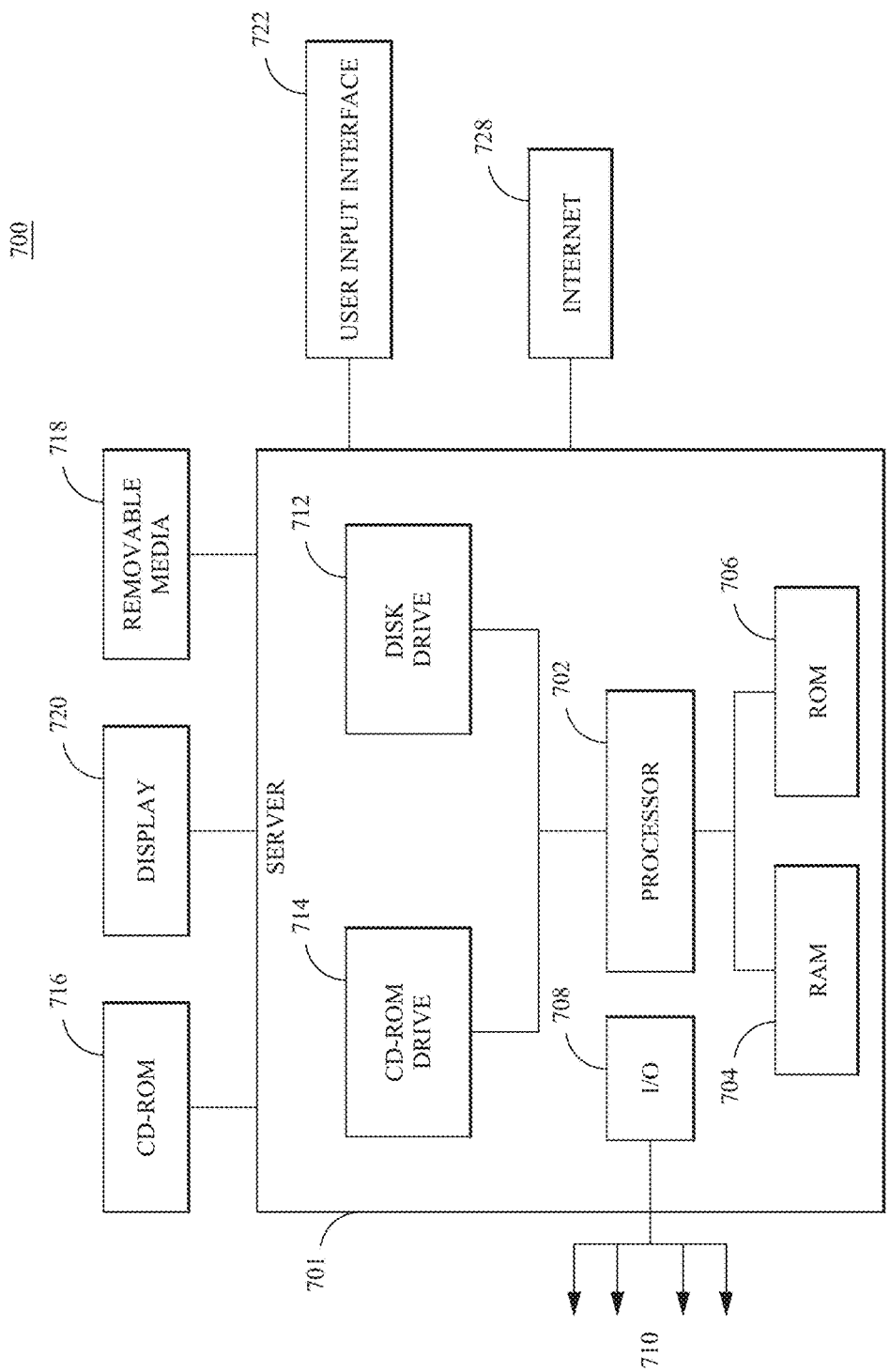
FIG. 7 is a block diagram of a map-generating apparatus according to an embodiment.
Figure 9:
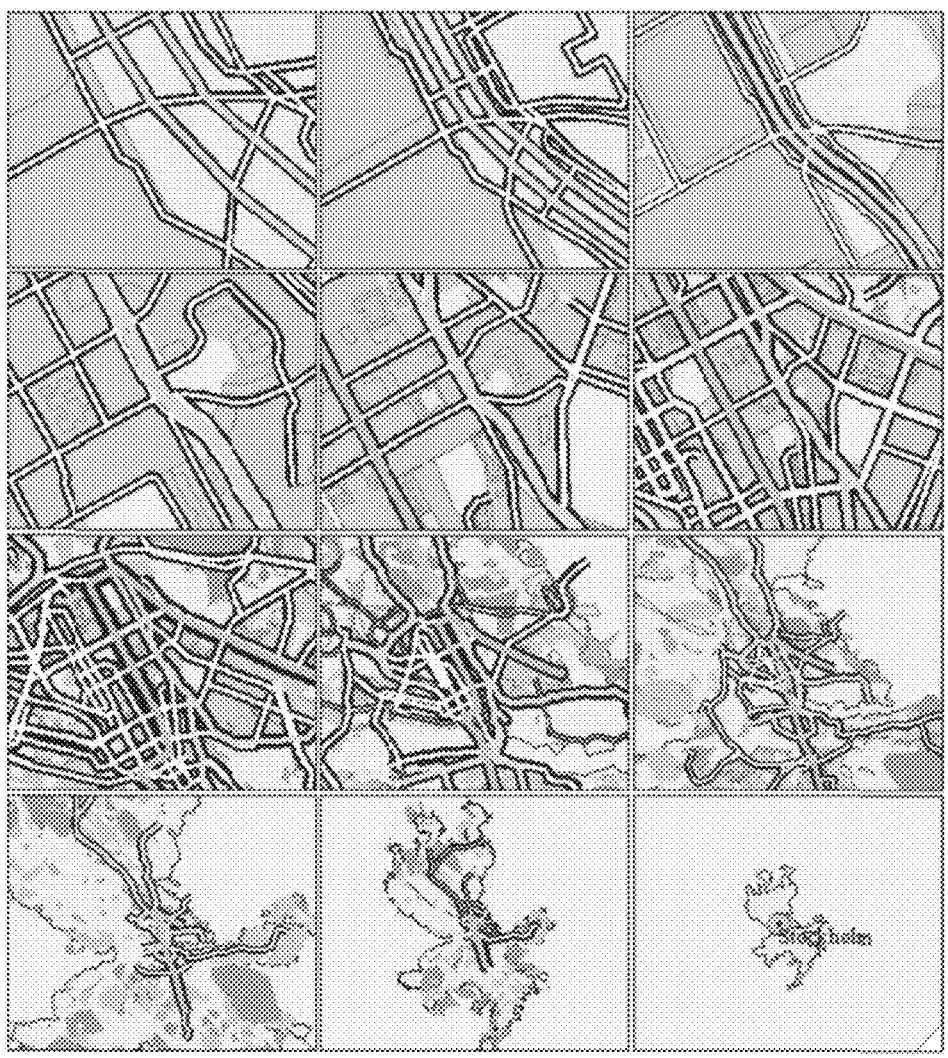
FIG. 9 illustrates maps obtained with a method according to an embodiment.

The above-discussed procedures and methods may be implemented in a map-generating apparatus as illustrated in FIG. 7. Hardware, firmware, software or a combination thereof may be used to perform the various steps and operations described herein. Map-generating apparatus 700 of FIG. 7 is an exemplary computing structure that may be used to automatically generate small-scale maps from a single large-scale map or database. Map generation according to the above-described methods is both computational- and data-intensive processes, for it engages of all geographic features of all types of an entire country. Testing for city of Stockholm (illustrated in FIG. 9) has been performed on a powerful desktop with 32 GB RAM, and a 1 TB hard disk, and it took 20 hours for the computer to generate 10 primary scales of maps. Therefore cloud- or grid-computing facilities may be employed for the map generation at a country scale.

Exemplary map-generating apparatus 700 includes a server 701 with a central processor (CPU) 702 coupled to a random access memory (RAM) 704 and to a read-only memory (ROM) 706. ROM 706 may also be other types of storage media to store programs, such as programmable ROM (PROM), erasable PROM (EPROM), etc. Processor 702, also called the data processing unit, may communicate with other internal and external components through input/output (I/O) circuitry 708 and bussing 710 to provide control signals and the like. Processor 702 carries out a variety of functions as are known in the art, as dictated by software and/or firmware instructions.

Server 701 may also include one or more data storage devices, including hard drives 712, CD-ROM drives 714 and other hardware capable of reading and/or storing information, such as DVD, etc. In one embodiment, software (i.e., executable codes) for carrying out the above-discussed methods may be stored and distributed on a CD-ROM or DVD 716, a USB storage device 718 or other form of media capable of portably storing information. These storage media may be inserted into, and read by, devices such as CD-ROM drive 714, disk drive 712, etc. Server 701 may be coupled to a display 720, which may be any type of known display or presentation screen, such as LCD, plasma display, cathode ray tube (CRT), etc.

A user input interface 722 including one or more user interface mechanisms such as a mouse, keyboard, microphone, touchpad, touch screen, voice-recognition system, etc., is also provided. Server 701 may be coupled to other devices, such as sources, detectors, etc. The server may be part of a larger network configuration as in a global area network (GAN) such as the Internet 728.

Figure 8:
FIG. 8 illustrate maps obtained by simply reducing map scales.

Quality of derived-scale maps is based on the scaling property of far more small geographic features than large ones, or far more less-connected geographic features than well-connected ones, and it is not affected by human subjective intervention. Therefore, derived maps quality is a matter of fact, little of human opinion. The enhanced quality is visible comparing FIG. 8 with FIG. 9. The panels in FIG. 8 illustrate maps obtained by simply reducing map scale without any selection or simplification, while the panels in FIG. 8 illustrate maps obtained with the automatic methods described in this section. The upper-left corner panel is a fragment of the large-scale map, the one next to the right is a derived map with scale a half of the original scale, the next one to the right is a derived map with scale one quarter of the original scale, etc. (the map scales decrease along each row and from one row to the next).

The disclosed exemplary embodiments provide methods and apparatus for automatically generating a series of small-scale maps from a single large-scale map or database based on the scaling law. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating one or more small-scale maps from a single large-scale map or database, the method comprising, for each of the one or more small-scale maps and for each type of geographic features automatically performing:

selecting a subset of geographic features to be represented in the small-scale map, wherein a number of geographic features in the subset is determined based on a scaling law, and the geographic features in the subset are determined based on topological connectivity or size or bend size or point density characterizing the geographic features, so as the subset to include larger or more connected among the geographic features;

generating the small-scale map using the subset made of selected geographic features, while maintaining topological relationships present in the single large-scale map or database among the selected geographic features; and displaying the generated small-scale map, wherein the geographic features characterized by number of connections are split into levels using head/tail breaks, and the topological connectivity T indicating a lowest level of the selected geographic features in the small-scale map with a scale denominator $M_d$ is calculated as $$T = \frac{\log_2\left(\frac{M_d}{M_0}\right)}{\log_2\left(\frac{M_m}{M_0}\right)} \times h(c)$$

where $M_o$ is an original scale denominator of the large-scale map or database, $M_m$ is a denominator of a minimum-scale in a scale series, and h(c) is an ht-index of topological connectivity of all connected geographic features of a certain type.

2. The method of claim 1, wherein the single large-scale map or database includes geographic features related to a country, a continent or entire world.

3. The method of claim 1, wherein each of the one or more small-scale maps is characterized by a small-map scale in a scale series, a denominator of the small-map scale being larger than a denominator of an original scale associated with the single large-scale map or database.

4. The method of claim 3, wherein a ratio of the small-scale denominator and the denominator of the original scale is a power of 2.

5. The method of claim 4, wherein
    if the area is a city, a denominator of a minimum scale in the scale series is $2^{10}$;
    if the area is a country, the denominator of the minimum scale in the scale series is $2^{12}$, and
    if the area is entire world, the denominator of the minimum scale the scale series is $2^{15}$.

6. The method of claim 1, wherein a selected geographic feature is simplified in the small-scale map with a scale denominator $M_d$ by using geometric details of levels higher than and equal to G calculated as $$G = \frac{\log_2\left(\frac{M_d}{M_0}\right)}{\log_2\left(\frac{M_m}{M_0}\right)} \times h(x)$$

where h(x) is an ht index of all bends of the selected geographic feature, $M_o$ is a denominator of an original scale associated with the single large-scale map or database, and $M_m$ is a denominator of a minimum scale in a scale series that includes the small-map scale.

7. The method of claim 1, wherein the selecting is performed separately for point-like geographic features, each of the point-like features being associated with a hierarchical level, and point-like geographic features included in the subset having higher hierarchical levels than point-like geographic features not included in the subset, the hierarchical level P being calculated as $$P = \frac{\log_2\left(\frac{M_d}{M_0}\right)}{\log_2\left(\frac{M_m}{M_0}\right)} \times h(\rho)$$

where $M_d$ is a denominator of a small-map scale, $M_o$ is a denominator of an original scale associated with the single large-scale map or database, $M_m$ is a denominator of a minimum scale in a scale series that includes the small-map scale, and $h(\rho)$ is an ht-index of density of point-like geographic features.

8. The method of claim 1, further comprising
determining a constant c in a power law $y=Nr^{-c}$, based on a number y of geographic features of a predetermined type in the subset of a primary-scale map, N being a constant, and r being a primary scale; and
calculating a number $y_2$ of geographic features of the predetermined type of the small-scale characterized by a scale $r_2$ as $y_2=Nr_2^{-c}$.

9. A map-generating apparatus configured to automatically generate one or more small-scale maps from a single large-scale map or database, the apparatus comprising:
an interface configured to enable receiving input triggering the one or more small-scale maps to be generated and to output the one or more small-scale maps;
a data processing unit connected to the interface and configured to perform for each of the one-or more small-scale maps
selecting a subset of geographic features to be represented in the small-scale map, wherein a number of geographic features in the subset is determined based on a scaling law, and the geographic features in the subset are determined based on topological connectivity or size or bend size or point density characterizing the geographic features, so as the subset to include larger or more connected among the geographic features; and
generating the small-scale map using the subset made of selected geographic features, while maintaining topological relationships present in the single large-scale map or database among the selected geographic features; and
a display device configured to display the generated small-scale map,
wherein the data processing unit is configured to split the geographic features characterized by number of connections into levels using a head/tail breaks technique, and to calculate the topological connectivity T indicating a lowest level of the selected geographic features as $$T = \frac{\log_2\left(\frac{M_d}{M_0}\right)}{\log_2\left(\frac{M_m}{M_0}\right)} \times h(c)$$

where $M_d$ is a scale denominator of the small-scale map, $M_o$ is an original scale denominator of the large-scale map or database, $M_m$ is a denominator of a minimum-scale in a scale series, and h(c) is an ht-index of topological connectivity of all connected geographic features of a certain type.

10. The apparatus of claim 9, wherein the single large-scale map or database includes geographic features related to a country, a continent or entire world.

11. The apparatus of claim 9, wherein each of the one or more small-scale maps is characterized by a small-map scale in a scale series, a denominator of the small-map scale being larger than a denominator of an original scale associated with the single large-scale map or database.

12. The apparatus of claim 11, wherein a ratio of the small-scale denominator and the denominator of the original scale is a power of 2.

13. The apparatus of claim 12, wherein
if the area is a city, a denominator of a minimum scale in the scale series is $2^{10}$;
if the area is a country, the denominator of the minimum scale in the scale series is $2^{12}$, and
if the area is entire world, the denominator of the minimum scale the scale series is $2^{15}$.

14. The apparatus of claim 9, wherein the data processing unit is configured to simplify a selected geographic feature using geometric details of level higher than and equal to G calculated as $$G = \frac{\log_2\left(\frac{M_d}{M_0}\right)}{\log_2\left(\frac{M_m}{M_0}\right)} \times h(x)$$

where h(x) is an ht index of all bends of the selected geographic feature, $M_d$ is a denominator of a small-map scale, $M_o$ is a denominator of an original scale associated with the single large-scale map or database, and $M_m$ is a denominator of a minimum scale in a scale series that includes the small-map scale.

15. The apparatus of claim 9, wherein the data processing unit is configured to select separately point-like geographic features, each of which is associated with a hierarchical level calculated for the point-like geographic features, so as point-like geographic features included in the subset have higher hierarchical levels than point-like geographic features not included in the subset, the hierarchical level P being calculated as $$P = \frac{\log_2\left(\frac{M_d}{M_0}\right)}{\log_2\left(\frac{M_m}{M_0}\right)} \times h(\rho)$$

where $M_d$ is a denominator of a small-map scale, $M_o$ is a denominator of an original scale associated with the single large-scale map or database, $M_m$ is a denominator of a minimum scale in a scale series that includes the small-map scale, and $h(\rho)$ is an ht-index of density of point-like geographic features.

16. The apparatus of claim 9, wherein the data processing unit is further configured:
to determine a constant c in a power law $y=Nr^{-c}$, based on a number y of geographic features of a predetermined type in the subset of a primary-scale map, N being a constant, and r being a primary scale r, and to calculate a number $y_2$ of geographic features of the predetermined type of the small-scale characterized by a scale $r_2$ as $y_2 = Nr_2^{-c}$.

17. A non-transitory computer-readable recording medium storing executable codes which, when executed by a processor having access to a large-scale map or database, generate one or more small-scale maps by performing for each of the one or more small-scale maps and for each type of geographic features:

selecting a subset of geographic features to be represented in the small-scale map, wherein a number of geographic features in the subset is determined based on a scaling law, and the geographic features in the subset are determined based on topological connectivity or size or bend size or point density characterizing the geographic features, so as the subset to include larger or more connected among the geographic features;

generating the small-scale map using the subset made of selected geographic features, while maintaining topological relationships present in the single large-scale map or database among the selected geographic features; and displaying the generated small-scale map, wherein the executable codes further make the processor to perform at least one of:

to split the geographic features characterized by number of connections are split into levels using a head/tail breaks technique, and to calculate the topological connectivity T indicating a lowest level of the selected geographic features in the small-scale map with a scale denominator $M_d$ is calculated as $$T = \frac{\log_2\left(\frac{M_d}{M_0}\right)}{\log_2\left(\frac{M_m}{M_0}\right)} \times h(c)$$

where $M_o$ is an original scale denominator of the large-scale map or database, $M_m$ is a denominator of a minimum-scale in a scale series, and h(c) is an ht-index of topological connectivity of all connected geographic features of a certain type;

to simplify a selected geographic feature in the small-scale map by using geometric details of levels higher than and equal to G which is calculated as $$G = \frac{\log_2\left(\frac{M_d}{M_0}\right)}{\log_2\left(\frac{M_m}{M_0}\right)} \times h(x)$$

where h(x) is an ht index of all bends of the selected geographic feature; and to select point-like geographic features separately, each of the point-like features being associated with a hierarchical level, and point-like geographic features included in the subset having higher hierarchical levels than point-like geographic features not included in the subset, the hierarchical level P being calculated as $$P = \frac{\log_2\left(\frac{M_d}{M_0}\right)}{\log_2\left(\frac{M_m}{M_0}\right)} \times h(\rho)$$

where $h(\rho)$ is an ht-index of density of point-like geographic features.

18. A map-generating apparatus configured to automatically generate one or more small-scale maps from a single large-scale map or database, the apparatus comprising:

an interface configured to enable receiving input triggering the one or more small-scale maps to be generated and to output the one or more small-scale maps;

a data processing unit connected to the interface and configured to perform for each of the one-or more small-scale maps;

selecting a subset of geographic features to be represented in the small-scale map, wherein a number of geographic features in the subset is determined based on a scaling law, and the geographic features in the subset are determined based on topological connectivity or size or bend size or point density characterizing the geographic features, so as the subset to include larger or more connected among the geographic features;

generating the small-scale map using the subset made of selected geographic features, while maintaining topological relationships present in the single large-scale map or database among the selected geographic features; and a display device configured to display the generated small-scale map, wherein the data processing unit is further configured:

to determine a constant c in a power law $y=N_r^{-c}$, based on a number y of geographic features of a predetermined type in the subset of a primary-scale map, N being a constant, and r being a primary scale r, and to calculate a number $y_2$ of geographic features of the predetermined type of the small-scale characterized by a scale $r_2$ as $y_2 = Nr_2^{-c}$.

* * * * *